United States Patent
Azevedo et al.

(10) Patent No.: US 10,125,719 B2
(45) Date of Patent: Nov. 13, 2018

(54) PISTON, OIL CONTROL RING THEREFOR AND METHOD OF CONSTRUCTION THEREOF

(71) Applicant: Federal-Mogul Corporation, Southfield, MI (US)

(72) Inventors: Miguel Azevedo, Ann Arbor, MI (US); Gregory Salenbien, Britton, MI (US); Matthew Belford, Milan, MI (US)

(73) Assignee: Tenneco Inc., Lake Forest, IL (US)

( * ) Notice: Subject to any disclaimer, the term of this patent is extended or adjusted under 35 U.S.C. 154(b) by 340 days.

(21) Appl. No.: 14/928,870

(22) Filed: Oct. 30, 2015

(65) Prior Publication Data
US 2017/0122248 A1    May 4, 2017

(51) Int. Cl.
| | |
|---|---|
| *F02F 3/00* | (2006.01) |
| *F16J 9/06* | (2006.01) |
| *F16J 9/20* | (2006.01) |
| *F16J 9/12* | (2006.01) |

(52) U.S. Cl.
CPC ............ *F02F 3/0015* (2013.01); *F16J 9/062* (2013.01); *F16J 9/12* (2013.01); *F16J 9/206* (2013.01)

(58) Field of Classification Search
CPC .................................. F02F 3/0015; F16J 9/12
See application file for complete search history.

(56) References Cited

U.S. PATENT DOCUMENTS

| | | | |
|---|---|---|---|
| 2,034,555 A | 3/1936 | Berstler | |
| 3,909,015 A * | 9/1975 | Kasahara | ................ F01C 19/08 277/357 |
| 3,921,988 A * | 11/1975 | Prasse | ........................ F16J 9/06 277/436 |
| 4,452,464 A | 6/1984 | Furuhama | |

(Continued)

FOREIGN PATENT DOCUMENTS

| | | |
|---|---|---|
| DE | 2122361 A1 | 11/1972 |
| DE | 102014003930 A1 | 9/2015 |

(Continued)

OTHER PUBLICATIONS

International Search Report, dated Feb. 7, 2017 (PCT/US2016/059284).

*Primary Examiner* — Kevin A Lathers
(74) *Attorney, Agent, or Firm* — Robert L. Stearns; Dickinson Wright PLLC

(57) ABSTRACT

A piston for an internal combustion engine having an improved oil control ring is provided. The piston has a piston body providing an upper combustion surface and an annular outer wall depending therefrom. A ring belt region including a plurality of ring grooves is formed in the annular outer wall. A first compression ring is disposed in one of the ring grooves and the oil control ring is disposed in another of the ring grooves. The oil control ring has generally parallel, planar upper and lower surfaces, with the upper and lower surfaces having an annular groove recessed therein. A through opening can be formed to bring the annular grooves (Continued)

into fluid communication with one another. The annular grooves collect oil scraped from a cylinder wall and return oil to the crank sump and reduce the contact area between the oil control ring and the wall of the ring groove.

29 Claims, 3 Drawing Sheets

(56) References Cited

U.S. PATENT DOCUMENTS

| | | | | |
|---|---|---|---|---|
| 4,629,200 | A | * 12/1986 | Ruddy | F16J 9/28 |
| | | | | 123/193.6 |
| 5,253,877 | A | * 10/1993 | DeBiasse | F16J 9/06 |
| | | | | 277/437 |
| 7,252,292 | B2 | 8/2007 | Panelli et al. | |
| 7,963,212 | B2 | 6/2011 | Ishida | |
| 2002/0033579 | A1 | 3/2002 | Ishida | |

FOREIGN PATENT DOCUMENTS

| | | |
|---|---|---|
| EP | 1248022 | 9/2002 |
| JP | H0398360 U | 10/1991 |

* cited by examiner

PISTON, OIL CONTROL RING THEREFOR AND METHOD OF CONSTRUCTION THEREOF

BACKGROUND OF THE INVENTION

1. Technical Field

This invention relates generally to internal combustion engines, and more particularly to pistons, to their methods of construction and to oil control rings therefor.

2. Related Art

Engine manufacturers are encountering increasing demands to improve engine efficiencies and performance, including, but not limited to, improving fuel economy, improving fuel combustion, reducing oil consumption, and reducing its size and weight. A major contributor to these issues relates directly to pistons within the engines. The pistons must be robust enough to handle the demands for increased power, while at the same time be reduced in mass to attain a reduction in size and weight. These interests are at odds with one another, and thus, it is becoming increasingly challenging to make further advances.

A piston and oil consumption ring therefor, constructed in accordance with this invention, provides enhanced engine running efficiencies, while having high strength and durability and also providing a reduction in overall size and mass to the engine.

SUMMARY OF THE INVENTION

In accordance with one aspect of the invention, a piston for an internal combustion engine having an improved oil control ring is provided. The piston has a piston body extending along a central longitudinal axis. The piston body has an upper combustion surface against which combustion forces act to cause the piston body to reciprocate along the central longitudinal axis. The piston body has an annular outer wall depending from the upper combustion surface with a ring belt region formed in the annular outer wall. The ring belt region includes a plurality of annular ring grooves spaced axially from one another along the direction of the longitudinal axis. A first compression ring is disposed in one of the ring grooves, and the oil control ring is disposed in one of the ring grooves further away from the upper combustion surface than the first compression ring. The oil control ring has upper and lower surfaces extending generally transversely to the central longitudinal axis, with inner and outer surfaces of the oil control ring extending between the upper and lower surfaces. Further, the upper and lower surfaces each have an annular groove extending therein. The annular grooves facilitate the collection of oil that is scraped from a cylinder wall, and further facilitate the return of the collected oil to a crank case sump. Further yet, the grooves reduce the area of contact between the oil control ring and the wall of the ring groove in the piston body, thereby reducing the potential for a stick condition between the oil control ring and the piston body.

In accordance with another aspect of the invention, the oil control ring is formed as a singled, monolithic member, thereby allowing the oil control ring to occupy less axial space extending along the longitudinal axis, and thereby providing the piston with a reduced compression height.

In accordance with another aspect of the invention, the improved oil control ring allows a piston therewith to function efficiently with only two pistons rings, including an uppermost compression ring, primarily functioning to seal combustion gases, and the single oil control ring, thereby further allowing the compression height of the piston to be minimized.

In accordance with another aspect of the invention, the improved oil control ring can include at least one through opening extending between the annular grooves in the upper and lower surfaces to bring the annular grooves into fluid communication with one another, thereby further facilitating the collection and draining of scraped oil.

In accordance with another aspect of the invention, the improved oil control ring can include an annular expander groove extending into the inner surface with an expander ring disposed in the expander groove to facilitate attaining an optimal contact pressure of the oil control ring outer surface against the cylinder wall to minimize oil consumption.

In accordance with another aspect of the invention, the improved oil control ring can include at least one tapered surface extending in oblique relation radially outwardly from at least one of the upper and lower surfaces toward the outer surface to facilitate minimizing running friction of the oil control ring against the cylinder wall.

In accordance with another aspect of the invention, the improved oil control ring can include a pair of tapered surfaces converging toward its outer surface.

In accordance with another aspect of the invention, the improved oil control ring can include one tapered surface depending from its upper surface and further include an annular concave surface beneath the tapered surface, thereby forming a hook-shaped annular nose extending about the oil control ring to facilitate scraping oil from the cylinder wall.

In accordance with another aspect of the invention, the improved oil control ring can be thermally formed and shaped, thereby doing away with the need for a separate expander ring, thereby reducing the number of components and material cost.

In accordance with another aspect of the invention, the improved oil control ring can be constructed from a relatively low cost ferrous metal.

In accordance with another aspect of the invention, the improved oil control ring can include a modified chromium-based coating plated to the outer surface, and further, can include nanodiamonds impregnated within the coating.

An oil control ring for a piston of an internal combustion engine, comprising:

In accordance with another aspect of the invention, an oil control ring is provided. The oil control ring has an annular body extending about a central axis. The annular body has substantially planar upper and lower surfaces extending generally transversely to the central axis and inner concave and outer convex surfaces extending between the upper and lower surfaces. The upper and lower surfaces each have an annular groove extending therein, thereby facilitating the collection of oil from a cylinder wall and the return of the collected oil to a crank case sump.

In accordance with another aspect of the invention, a method of constructing a piston for an internal combustion engine is provided. The method includes providing a piston body, extending along a central longitudinal axis, having an upper combustion surface against which combustion forces act to cause the piston body to reciprocate along the central longitudinal axis and having an annular outer wall depending from the upper combustion surface with a ring belt region formed in the annular outer wall, with the ring belt region including a plurality of annular ring grooves. Further, disposing a first compression ring in one of the ring grooves nearest the upper combustion surface and disposing an oil control ring in one of the ring grooves further away from the upper combustion surface than the first compression ring. Further, providing the oil control ring having upper and lower surfaces extending generally transversely to the central longitudinal axis and having inner and outer surfaces extending between the upper and lower surfaces. Further yet, providing the upper and lower surfaces each having an annular groove extending therein.

In accordance with another aspect of the invention, the method can include providing the oil control ring having at least one through opening extending between the annular grooves to bring the annular grooves into fluid communication with one another, and can further include providing the at least one through opening as a plurality of through openings.

In accordance with another aspect of the invention, the method can include providing at least one tapered surface extending in oblique relation radially away from at least one of the upper and lower surfaces toward the outer surface, and can further include providing the at least one tapered surface as a pair of opposite tapered surfaces converging toward the outer surface.

In accordance with another aspect of the invention, the method can further include providing an annular concave surface beneath the tapered surface extending from the upper surface, thereby providing the oil control ring having a generally hook-shape annular outer lip to enhance the oil scraping capacity of the oil control ring.

In accordance with another aspect of the invention, a method of constructing an oil control ring for a piston of an internal combustion engine is provided. The method includes obtaining an annular body having substantially planar upper and lower surfaces extending generally transversely to a central axis, with the body having inner concave and outer convex surfaces extending between the upper and lower surfaces. Further, forming annular grooves in the upper and lower surfaces.

In accordance with another aspect of the invention, the method of constructing the oil control ring can include bringing the annular grooves into fluid communication with one another by forming at least one opening extending through the annular grooves, thereby further enhancing the collection of oil from the cylinder wall and the return of oil to the crank case sump.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1A:
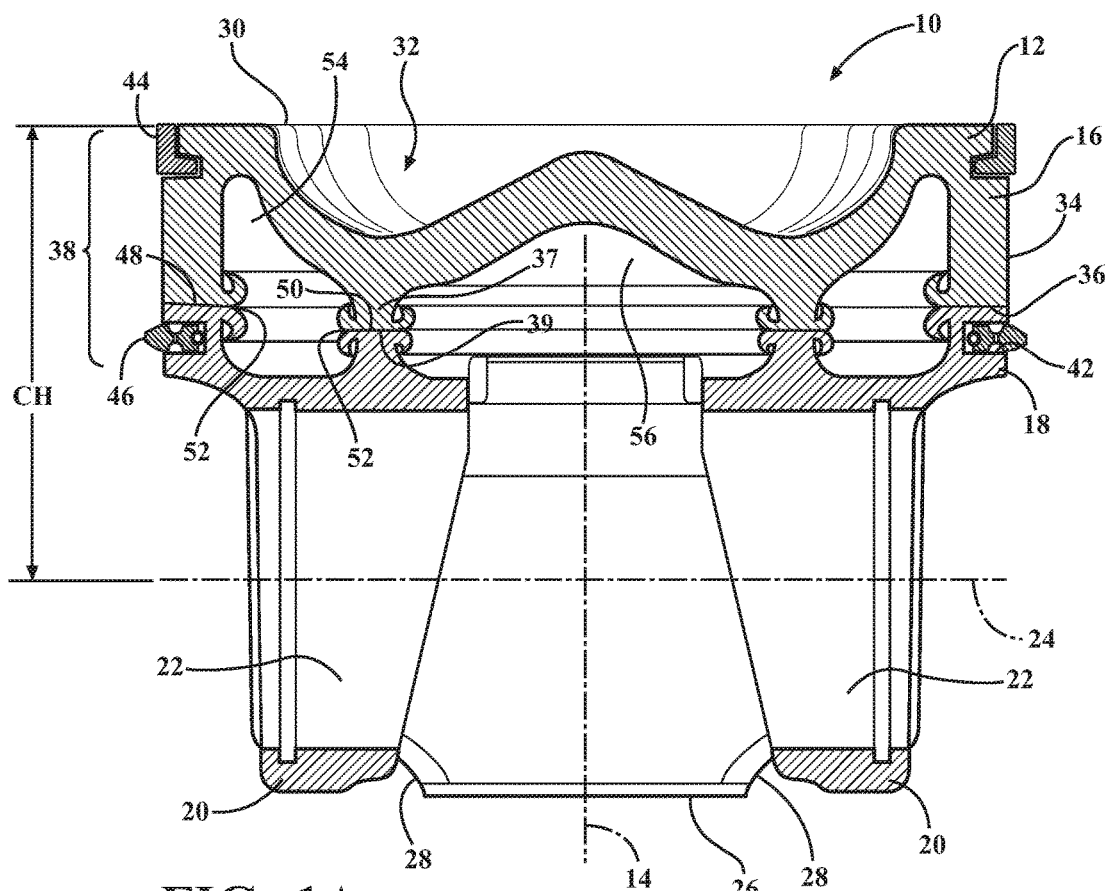
FIG. 1A is cross-sectional view of a piston constructed in accordance with one aspect of the invention.
Figure 1B:
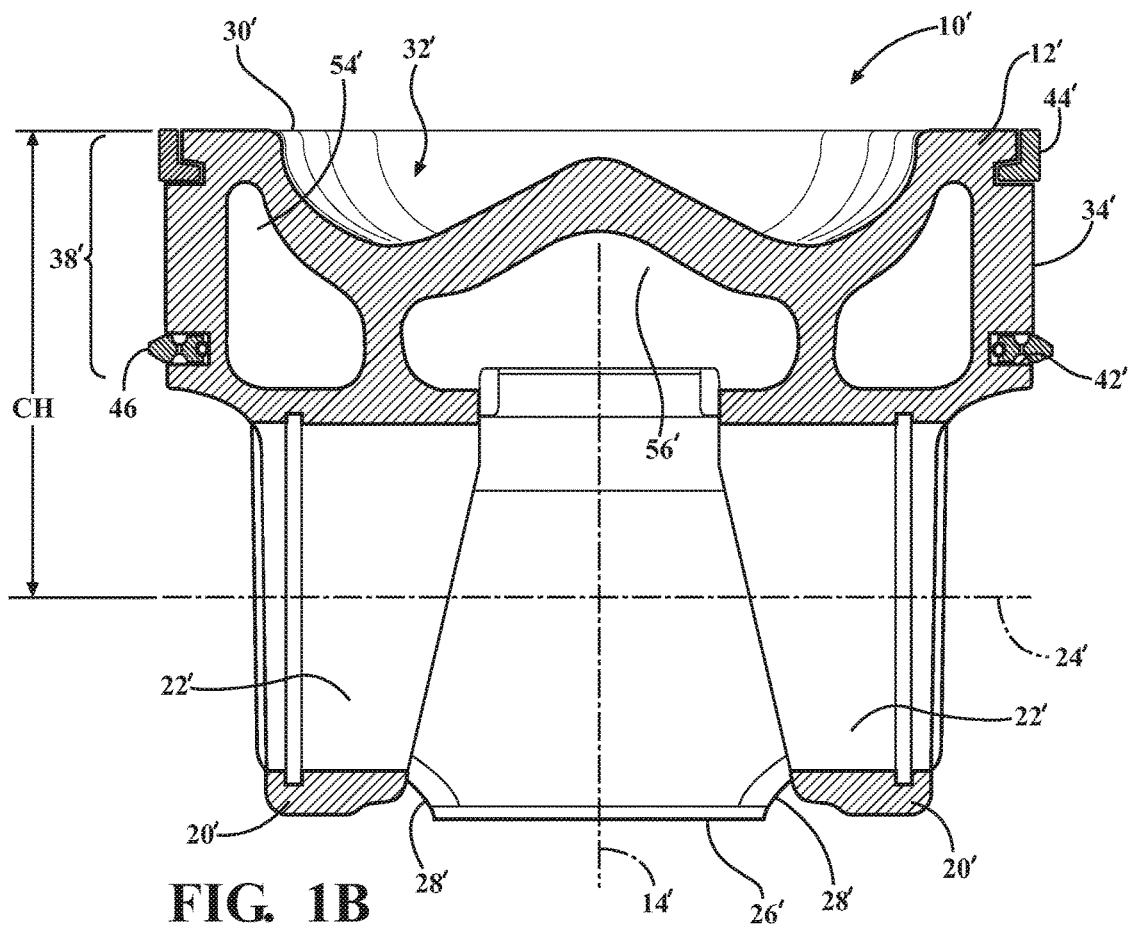
FIG. 1B is a view similar to FIG. 1A of a piston constructed in accordance with one aspect of the invention.

Referring in more detail to the drawings, FIGS. 1A and 1B illustrate respective pistons 10, 10' constructed according to presently preferred embodiments of the invention for reciprocating movement in a cylinder bore or chamber (not shown) of an internal combustion engine, such as a heavy duty diesel engine, for example. The difference between the two pistons 10, 10' is with regard to piston 10 being constructed of two parts fixed together and the piston 10' being constructed as a single, monolithic piece of material. Otherwise, the pistons are similar, and thus, the same reference numerals, with the reference numerals for the piston 10' being primed ('), are used hereafter to identify like features. The piston 10, 10' has a body 12, 12' either cast or forged, or formed by any other process of manufacture, extending along a longitudinal central axis 14, 14' along which the piston 10, 10' reciprocates in the cylinder bore. The body 12 has an upper part, also referred to as upper crown 16 joined to a lower part, also referred to as lower crown 18. The body 12, 12' has a pair of pin bosses 20, 20', with the pin bosses 20 depending from the upper crown 16, to provide laterally spaced pin bores 22, 22' aligned along a pin bore axis 24, 24' that extends generally transverse to the longitudinal central axis 14, 14'. The pin bosses 20, 20' are joined to laterally spaced skirt portions 26, 26' via strut portions 28, 28'. The skirt portions 26, 26' are diametrically spaced from one another across opposite sides the pin bore axis 24, 24' and have convex outer surfaces contoured for sliding motion along a cylinder wall 29 within the cylinder bore to maintain the piston 10, 10' in a desired orientation as it reciprocates through the cylinder bore. The upper crown 16 and each body 12, 12' has an upper combustion surface 30, 30' with a combustion bowl 32, 32' recessed therein to provide a desired gas flow with the cylinder bore. An outer wall 34, 34' depends from the upper surface 30, 30', with a portion of the outer wall 34 formed by the upper crown 16 shown as extending to an outer free end 36, with at least a portion of a ring belt region 38 being formed in the portion of the outer wall 34 provided by the upper crown 16, while the outer wall 34' of the monolithic body 12' further includes a ring belt region 38'. The upper crown 16 is further shown having an annular inner rib 37 depending from an undercrown surface of the combustion bowl 32 to an inner free end 39. The ring belt region 38, 38' includes a plurality of annular ring grooves, shown as a pair of ring grooves 40, 42; 40', 42' with a first of the ring grooves 40, 40' being formed closest to the upper combustion surface 30, 30' in the outer wall 34, 34' of the body 12, 12' and a second of the ring grooves 42, 42' being formed further away from the upper combustion surface 30, 30' than the first ring groove 40, 40' in the outer wall 34, 34'. The first ring groove 40, 40' is shown as having a radially recessed upper surface, thereby forming a generally L-shaped annular pocket, as viewed in cross-section. A first piston ring, provided as a compression ring 44, 44' is disposed in the first ring groove 40, 40' and a second piston ring, provided as an improved oil control ring, shown generally at 46 in FIGS. 1A and 1B, and identified in FIG. 2 as a first presently preferred embodiment at 46', and in FIG. 3 as a second presently preferred embodiment at 46", is disposed in the second ring groove 42, 42'. The second ring groove 42, 42' is shown as having a plurality of oil drainage ports 43, 43' extending along and into a lower or bottom surface thereof. The oil drainage ports 43, 43' are formed as drilled holes extending through the outer wall 34, 34' and at least in part into the bottom surface of the second ring groove 42, 42' to the back wall of the second ring groove 42, 42'. The plurality of oil drainage ports 43, 43' are preferably formed along the front and back sides of the piston 10, 10', substantially in line with the pin bore axis 24, 24', wherein 2-3 such oil drainage ports 43, 43' preferably extend into each opposite side, by way of example and without limitation. The compression ring 44, 44' is shown as having a generally L-shaped cross-section, known in the art as a Dykes-type piston ring, wherein an upper surface of the compression ring 44, 44' is substantially planar with the upper surface 30, 30', while the improved oil control ring 46 is provided in accordance with the invention to afford the piston 10, 10' with at least the following advantages: a reduced piston compression height CH (known as the distance from the upper combustion surface 30, 30' to the pin bore axis 24, 24', reduced piston mass, reduced friction losses stemming from the piston rings 44, 44', 46, reduced fuel consumption, reduced power loss, reduced oil consumption, reduced stick of the oil control ring 46 within the ring groove 42, 42' and reduced manufacturing cost. These, among other advantages will be readily recognized by those skilled in the piston art.

For the two part piston 10, the lower crown 18 is constructed separately from the upper crown 16, such as in a forging process, by way of example and without limitation, and then joined to the upper crown 16 via an upstanding annular outer rib free end 48 and an upstanding annular inner rib free end 50. The lower crown 18 can be constructed from any suitable material, such as an economical steel material, e.g. low grade steel alloy, e.g. 4140H, or a micro-alloyed steel, for example. The upper and lower crowns 16, 18 are represented here as being joined together by a friction weld or any other suitable type of weld joint 52 formed across the respective outer free ends 36, 48 and inner free ends 39, 50. As such, as with the piston 10', a substantially closed outer cooling gallery 54, 54' is provided between the upper and lower crowns 16, 18, while an open inner gallery 56, 56' is provided upwardly of the pin bores 22, 22' beneath a central portion of the combustion bowl 32, 32'. It should be recognized that the piston 10, constructed in accordance with the invention, could have upper and lower crown portions formed otherwise, with both pistons 10, 10' having different configurations of cooling galleries, or being free or substantially free of cooling galleries, for example.

Figure 2:
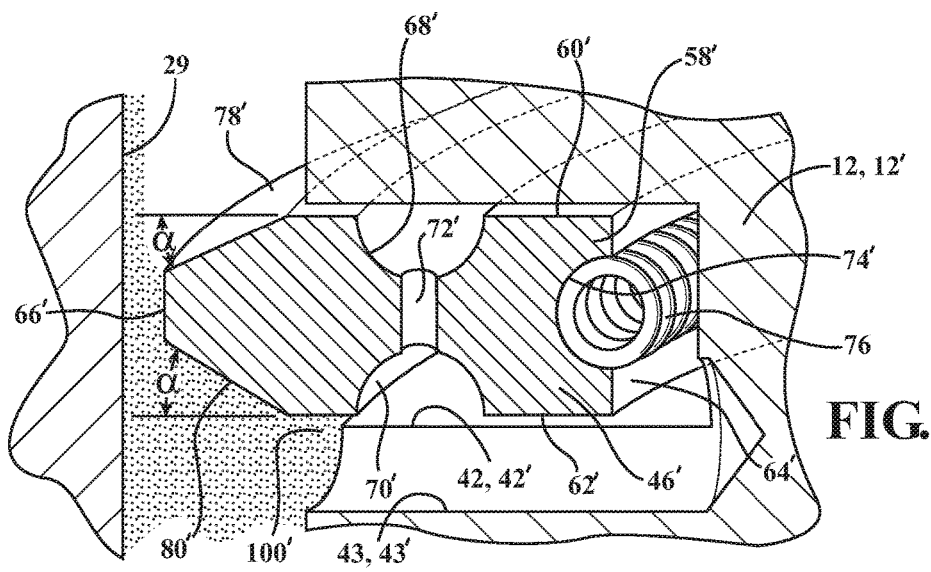
FIG. 2 is fragmentary cross-sectional perspective view of an oil control ring constructed in accordance with one aspect of the invention of the pistons of FIGS. 1A-1B.
Figure 3:
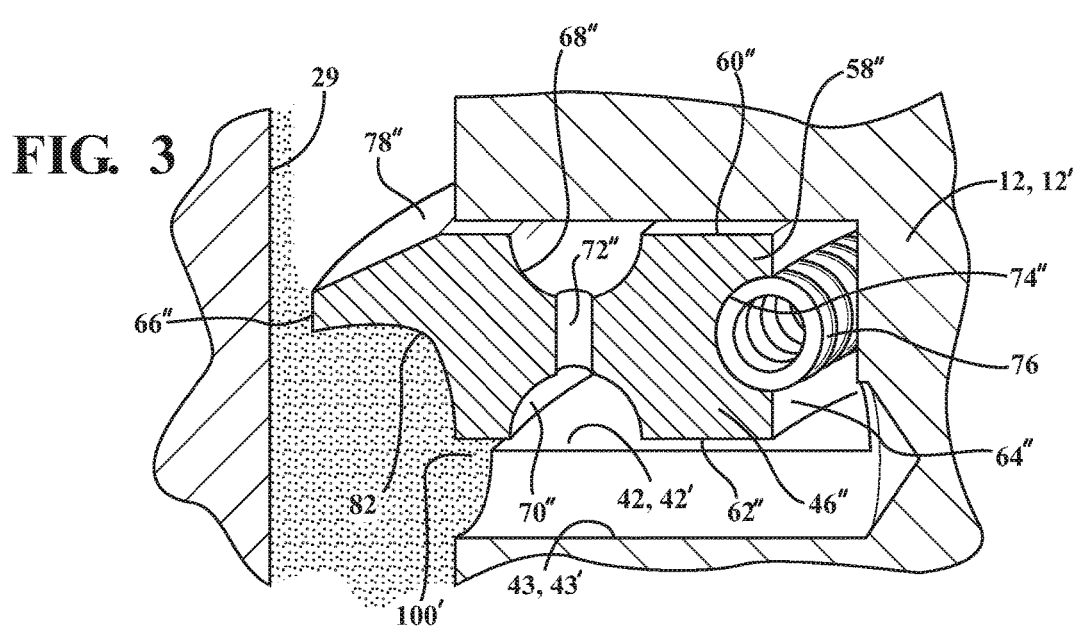
FIG. 3 is fragmentary cross-sectional perspective view of an oil control ring constructed in accordance with one aspect of the invention of the pistons of FIGS. 1A-1B.
Figure 4:
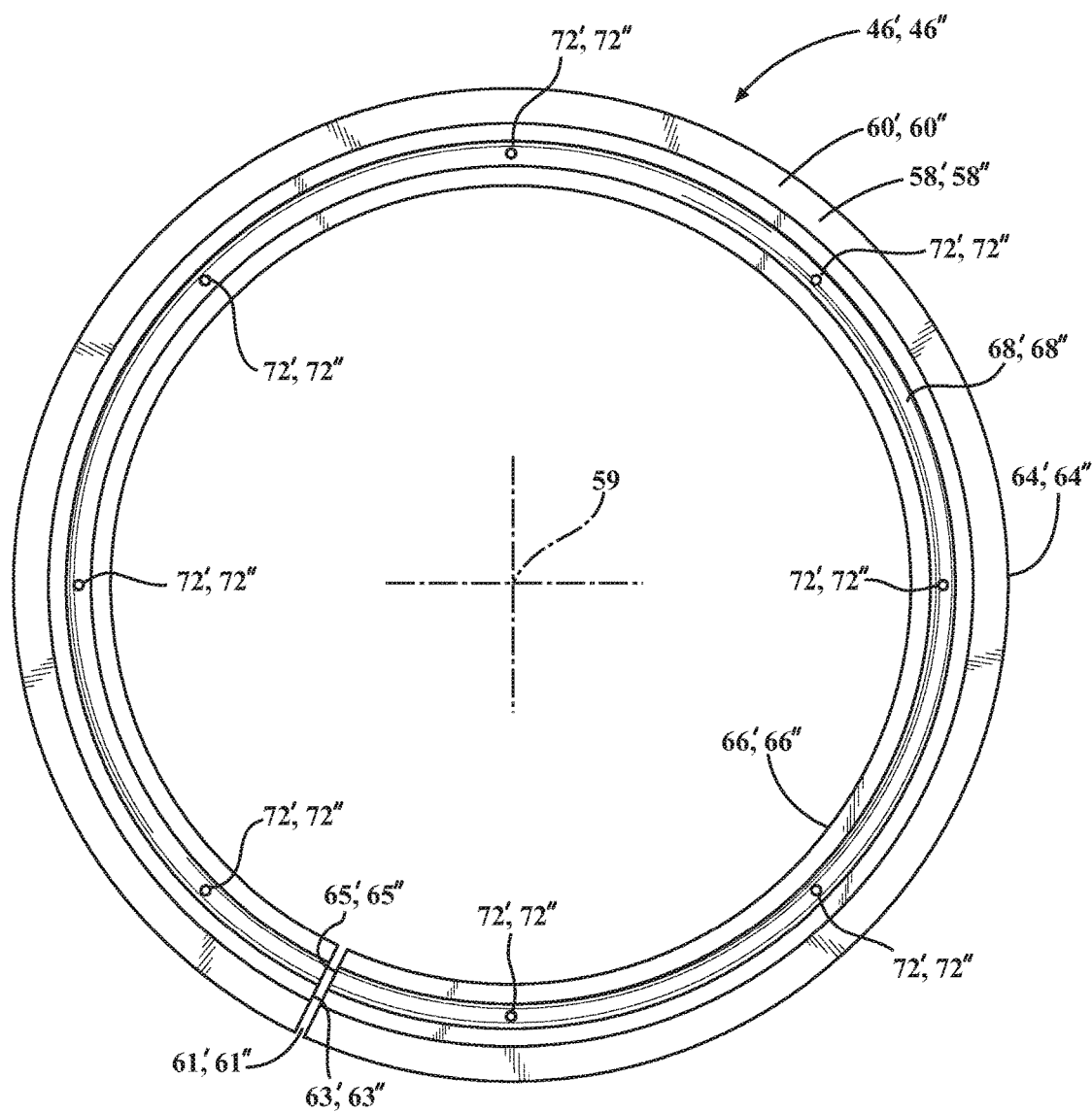
FIG. 4 is a plan view of the oil control rings of FIGS. 2 and 3.

The oil control ring 46', 46", as shown in FIG. 4, has a circumferentially split, toroid-shaped, annular body 58', 58" extending about a central axis 59 (the central axis 59 extends in and out of the page as shown) that is configured for coaxial alignment with the longitudinal central axis 14, 14' of the piston 10, 10'. The split is provided by a gap 61', 61" extending between opposite free ends 63', 63", 65', 65" of the ring 46', 46", thereby allowing radial expansion and contraction, as needed. With reference to FIGS. 2 and 3, the annular body 58', 58" has planar or substantially planar upper surfaces 60', 60" and lower surfaces, 62', 62" that extend generally transversely to the central axis 59 and concave inner surfaces 64', 64" and convex outer surfaces 66', 66" extending between the upper surfaces 60', 60" and lower surfaces 62', 62". To facilitate the collection of oil from the cylinder wall and the return of the oil to the crank sump, the upper and lower surfaces 60', 60", 62', 62" each have a respective annular groove 68', 68", 70', 70" extending therein. The grooves 68', 68", 70', 70" are shown as being generally mirrored in configuration with one another, and are shown as being generally U-shaped in cross-section, by way of example and without limitation. To further yet enhance the collection of oil from the cylinder wall and the return of the oil to the crank sump, the body 58', 58" has at least one, and preferably a plurality of through openings 72', 72" extending between the annular grooves 68', 68", 70', 70" to bring the annular grooves 68', 68", 70', 70" into fluid communication with one another. The through openings 72', 72", also referred to simply as openings, are shown as passing through the valleys of the grooves 68', 68", 70', 70" and being spaced circumferentially in uniform, equidistant relation from one another. In addition, at least some of the though openings 72', 72" can be axially aligned with the oil drain ports 43, 43', thereby further improving the return flow of oil back to the crank sump. In addition to facilitating the collection and return of oil to the crank sump, the grooves 68', 68", 70', 70" further contribute to the reduction of friction and sticking of the control ring 46', 46" within the ring groove 42, 42'. This is due in part to the increased presence of oil within the grooves 68', 68", 70', 70", and further to the reduce contact area of the upper and lower surfaces 60', 60", 62', 62" with the opposite surfaces of the ring groove 42, 42'.

The concave inner surface 64', 64" is shown as having an annular expander groove or recess 74', 74" extending therein, with the recess 74', 74" being sized for at least partial receipt of an expander ring 76. The expander ring 76 facilitates biasing the oil control ring 46', 46" radially outwardly into close proximity with the cylinder wall 29 to enhance the specific pressure therewith, thereby enhancing the oil control properties of the oil control ring 46', 46" by reducing consumption and passage of oil by the oil control ring 46', 46". However, it is contemplated that the inner surface 64', 64" could remain free of the recess 74', 74", with no expander ring being used, with the oil control ring 46', 46" being heat-formed to retain a resilient, predetermined shape.

The oil control ring 46 further includes at least one tapered surface extending in oblique relation radially away from at least one of the upper and lower surfaces 60', 60", 62', 62" toward the outer surface 66', 66". In the embodiment 46' shown in FIG. 2, a pair of tapered surfaces 78', 80' are shown converging toward one another as they extend radially outwardly from the axis 59, with one tapered surface 78' extending in oblique relation from the upper surface 60' toward the outer surface 66' and another, opposite tapered surface 80' extending in oblique relation from the lower surface 62' toward the outer surface 66'. The tapered surfaces 78', 80' provide the radially outer region of the oil control ring 46' with a truncated conical shape in cross-section, also referred to as frustro-conical. The tapered surfaces 78', 80' can be inclined from the upper and lower surfaces 60', 62' at any desired angle $\alpha$, and preferably between about 10-60 degrees, and more preferably between about 25-45 degrees, by way of example and without limitation. The tapered surfaces 78', 80' can be formed in generally mirrored relation with one another, extending from their respective upper and lower surface 60', 62' at the same angle $\alpha$, though it is contemplated herein that one of the tapered surfaces 78', 80' can be inclined at a different angle $\alpha$ relative to the respective upper and lower surface 60', 62' than the other of the tapered surfaces 78', 80'.

In the embodiment shown in FIG. 3, the oil control ring 46" is formed having a single tapered surface, shown as a tapered surface 78" extending radially outwardly from the axis 59 to the outer surface 66", wherein the tapered surface 78" extends from the upper surface 60" at an angle $\alpha$ of inclination thereto, as described above for the upper surface 60'. However, rather than having an opposite tapered surface, as shown and described for the oil control ring 46', an annular concave surface 82 is formed beneath the tapered surface 78". The concave surface 82 is shown as arching initially upwardly from the lower surface 62" and then reaching a plateau or peak and then curling outwardly to the outer surface 66", shown as extending slight downwardly to the outer surface 66", thereby forming a generally hook-shaped nose arching slightly downwardly from the upper surface 60". It should be recognized that various radii of curvature can be used to form the concave surface 82, including a constant radii or a varying radii.

In accordance with another aspect of the invention, a method of constructing a piston 10, 10' for an internal combustion engine is provided. The method includes providing a piston body 12, 12' extending along a central longitudinal axis 14, 14' and having an upper combustion surface 30, 30' against which combustion forces act to cause the piston body 12, 12' to reciprocate along the central longitudinal axis 14, 14'. Further, providing the piston body 12, 12' having an annular outer wall 34, 34' depending from the upper combustion surface 30, 30' with a ring belt region 38, 38' formed therein, with the ring belt region 38, 38' including a plurality of annular ring grooves 40, 40', 42, 42'. Further, disposing a first compression ring 44 in one of the ring grooves 40, 40' nearest the upper combustion surface 30, 30' and disposing an oil control ring 46', 46" in one of the ring grooves 42, 42' further away from the upper combustion surface 30, 30' than the first compression ring 40, 40'. Further yet, providing the oil control ring 46', 46" having upper 60', 60" and lower 62', 62" surfaces extending generally transversely to the central longitudinal axis 14, 14' and inner 64', 64" and outer surfaces 66', 66" extending between the upper 60', 60" and lower 62', 62" surfaces, and providing the upper 60', 60" and lower 62', 62" surfaces each having an annular groove 68', 70', 68", 70" extending therein. The method can further include providing the respective oil control rings 46', 46" with features as discussed above, such as one or more through openings 72', 72" bringing the annular groove 68', 70', 68", 70" into fluid communication with one another.

In accordance yet a further aspect of the invention, a method of constructing an oil control ring 46', 46" for a piston 10, 10' of an internal combustion engine is provided. The method includes obtaining an annular body having substantially planar upper 60', 60" and lower 62', 62" surfaces extending generally transversely to a central axis 59, with the body having inner concave 64', 64" and outer convex 66', 66" surfaces extending between the upper 60', 60" and lower surfaces 62', 62". Further, forming annular grooves 68', 70', 68", 70" in the upper 60', 60" and lower 62', 62" surfaces. The method can further include providing the respective oil control rings 46', 46" with features as discussed above, such as one or more through openings 72', 72" bringing the annular groove 68', 70', 68", 70" into fluid communication with one another. Further yet, the method can include forming an annular concave surface 82 beneath the tapered surface 78" of the oil control ring 46". The concave surface 82 can be formed arching initially upwardly from the lower surface 62" and then reaching a plateau or peak and then curling outwardly to the outer surface 66", shown as extending slight downwardly to the outer surface 66", by way of example and without limitation, thereby forming a generally hook-shaped nose arching slightly downwardly from the upper surface 60". It should be recognized that while forming the concave surface 82, various radii of curvature can be used to form the curvature of the concave surface 82, as desired, including a constant radii or a varying radii.

Obviously, many modifications and variations of the present invention are possible in light of the above teachings. It is, therefore, to be understood that within the scope of the appended claims, the invention may be practiced otherwise than as specifically described.

What is claimed is:

1. A piston for an internal combustion engine, comprising:
a piston body extending along a central longitudinal axis, said piston body having an upper combustion surface against which combustion forces act to cause said piston body to reciprocate along said central longitudinal axis, said piston body having an annular outer wall depending from said upper combustion surface with a ring belt region formed in said annular outer wall, said ring belt region including a plurality of annular ring grooves spaced from one another along said longitudinal axis;
a compression ring disposed in one of said ring grooves; and
an oil control ring disposed in one of said ring grooves further away from said upper combustion surface than said first compression ring, said oil control ring having upper and lower surfaces extending generally transversely to said central longitudinal axis and inner and outer surfaces extending between said upper and lower surfaces, said upper and lower surfaces each having an annular groove extending therein; and
further including at least one through opening extending between said annular grooves to bring said annular grooves into fluid communication with one another.

2. The piston of claim 1 wherein a circumferentially continuous wall bounds said at least one through opening.

3. The piston of claim 1 wherein said at least one through opening includes a plurality of through openings.

4. The piston of claim 3 wherein said plurality of through openings are spaced circumferentially in uniform, equidistant relation from one another.

5. The piston of claim 1 wherein said annular grooves have mirrored configurations with one another.

6. The piston of claim 1 further including an annular expander groove extending into said inner surface with an expander ring disposed in said expander groove.

7. The piston of claim 1 further including at least one tapered surface extending in oblique relation radially outwardly from at least one of said upper and lower surfaces toward said outer surface.

8. The piston of claim 7 wherein said at least one tapered surface includes a pair of tapered surfaces converging toward said outer surface.

9. The piston of claim 7 wherein said at least one tapered surface depends from said upper surface and further including an annular concave surface beneath said tapered surface.

10. An oil control ring for a piston of an internal combustion engine, comprising:
an annular body extending about a central axis, said annular body having substantially planar upper and lower surfaces extending generally transversely to said central axis and inner concave and outer convex surfaces extending between said upper and lower surfaces, said upper and lower surfaces each having an annular groove extending therein.

11. The oil control ring of claim 10 further including at least one through opening extending between said annular grooves to bring said annular grooves into fluid communication with one another.

12. The oil control ring of claim 11 wherein said at least one through opening includes a plurality of through openings.

13. The oil control ring of claim 12 wherein said plurality of through openings are spaced circumferentially in uniform, equidistant relation from one another.

14. The oil control ring of claim 13 further including an annular expander groove extending into said concave inner surface with an expander ring disposed in said expander groove.

15. The oil control ring of claim 10 further including at least one tapered surface extending in oblique relation radially away from at least one of said upper and lower surfaces toward said outer surface.

16. The oil control ring of claim 15 wherein said at least one tapered surface includes a pair of tapered surfaces converging toward said outer surface.

17. The oil control ring of claim 15 wherein said at least one tapered surface depends from said upper surface and further including an annular concave surface beneath said tapered surface.

18. A method of constructing a piston for an internal combustion engine, comprising:
 providing a piston body, extending along a central longitudinal axis, having an upper combustion surface against which combustion forces act to cause the piston body to reciprocate along the central longitudinal axis and having an annular outer wall depending from the upper combustion surface with a ring belt region formed in the annular outer wall, with the ring belt region including a plurality of annular ring grooves;
 disposing a first compression ring in one of the ring grooves nearest the upper combustion surface;
 disposing an oil control ring in one of the ring grooves further away from the upper combustion surface than the first compression ring; and
 providing the oil control ring having upper and lower surfaces extending generally transversely to the central longitudinal axis and inner and outer surfaces extending between said upper and lower surfaces, and providing the upper and lower surfaces each having an annular groove extending therein, and wherein said grooves are open and free of sealing rings and further including providing the oil control ring having at least one through opening extending between the annular grooves to bring the annular grooves into fluid communication with one another.

19. The method of claim 18 further including providing the at least one through opening as a plurality of through openings.

20. The method of claim 18 further including providing at least one tapered surface extending in oblique relation radially away from at least one of the upper and lower surfaces toward the outer surface.

21. The method of claim 20 further including providing the at least one tapered surface as a pair of tapered surfaces converging toward the outer surface.

22. The method of claim 20 further including providing the at least one tapered surface depending from the upper surface and further including providing an annular concave surface beneath the tapered surface.

23. A method of constructing an oil control ring, comprising:
 obtaining an annular body having substantially planar upper and lower surfaces extending generally transversely to a central axis, with the body having inner concave and outer convex surfaces extending between the upper and lower surfaces;
 forming annular grooves in the upper and lower surfaces, and
 bringing the annular grooves into fluid communication with one another by forming at least one opening extending through the annular grooves.

24. The method of claim 23 further including forming the at least one opening as a plurality of openings spaced from one another.

25. The method of claim 24 further including spacing the plurality of openings in uniform, equidistant relation from one another.

26. The method of claim 23 further including forming an annular expander groove in the concave inner surface.

27. The method of claim 23 further including forming at least one tapered surface extending in oblique relation radially outwardly from at least one of the upper and lower surfaces toward the outer surface.

28. The method of claim 27 further including forming the at least one tapered surface as a pair of tapered surfaces converging toward the outer surface.

29. The method of claim 27 further including forming the at least one tapered surface depending from the upper surface and further including forming an annular concave surface beneath the tapered surface.

* * * * *